(12) United States Patent
Hild

(10) Patent No.: US 7,700,207 B2
(45) Date of Patent: Apr. 20, 2010

(54) TURBOCOMPRESSOR SHUTDOWN MECHANISM

(75) Inventor: Thomas Hild, Mainz (DE)

(73) Assignee: GM Global Technology Operations, Inc., Detroit, MI (US)

(*) Notice: Subject to any disclaimer, the term of this patent is extended or adjusted under 35 U.S.C. 154(b) by 832 days.

(21) Appl. No.: 11/558,102

(22) Filed: Nov. 9, 2006

(65) Prior Publication Data
US 2008/0110685 A1 May 15, 2008

(51) Int. Cl.
H01M 8/00 (2006.01)
(52) U.S. Cl. ............................. 429/12; 429/30; 429/34; 429/38; 417/423.1
(58) Field of Classification Search ................. 429/34, 429/38, 39, 19, 22, 25, 12, 30; 417/423.1; 60/798, 805
See application file for complete search history.

(56) References Cited

U.S. PATENT DOCUMENTS

| | | | |
|---|---|---|---|
| 4,041,210 A | 8/1977 | Van Dine | |
| 4,128,700 A | 12/1978 | Sederquist | |
| 4,149,832 A | 4/1979 | Sivolap et al. | |
| 4,352,863 A * | 10/1982 | Maru | 429/17 |
| 4,725,206 A | 2/1988 | Glaser et al. | |
| 4,786,238 A | 11/1988 | Glaser et al. | |
| 4,865,926 A | 9/1989 | Levy et al. | |
| 4,879,189 A | 11/1989 | Snopkowski | |
| 5,087,176 A | 2/1992 | Wieland | |
| 5,765,998 A | 6/1998 | Zacharias et al. | |
| 6,231,302 B1 | 5/2001 | Bonardi | |
| 6,265,786 B1 | 7/2001 | Bosley et al. | |
| 6,464,469 B1 | 10/2002 | Grob et al. | |
| 6,607,854 B1 | 8/2003 | Rehg et al. | |
| 6,691,519 B2 * | 2/2004 | Little | 60/798 |
| 6,878,362 B2 * | 4/2005 | Kumar et al. | 423/651 |
| 6,958,550 B2 | 10/2005 | Gilbreth et al. | |
| 7,043,916 B2 | 5/2006 | Masuda | |
| 2003/0113215 A1 | 6/2003 | Choi et al. | |
| 2006/0153704 A1 | 7/2006 | Elpern et al. | |

* cited by examiner

*Primary Examiner*—Raymond Alejandro
(74) *Attorney, Agent, or Firm*—Dinsmore & Shohl LLP

(57) ABSTRACT

Turbocompressors 1 comprise a turbine 10, a compressor 30, a rotatable shaft 20 connecting the turbine 10 and compressor 30 at opposite ends of the shaft 20, and an electric motor 50 coupled to the compressor 30. The turbine 10 comprises an inlet port 14 configured to receive an air feed, and a turbine wheel 12 connected to the shaft 20 and configured to rotate in response to a torque ($\tau_M$) provided by the air feed. The rotation of the turbine wheel 12 is rotates the rotatable shaft 20 and a compressor wheel 32 of the compressor 30 connected thereto. The compressor 30 comprises an inlet port configured to receive and compress an air feed. The electric motor 50 may deliver a torque ($\tau_M$) to the compressor wheel 32 in a direction opposite the direction of rotation of the rotatable shaft 20 in order to shut down the turbocompressor 1.

10 Claims, 2 Drawing Sheets

TURBOCOMPRESSOR SHUTDOWN MECHANISM

FIELD OF THE INVENTION

This invention is generally directed to turbocompressors as well as systems and methods incorporating turbocompressors, and is specifically directed to turbocompressor shutdown mechanisms designed to minimize shutdown times and thereby maximize the machine life of the turbocompressor.

BACKGROUND OF THE INVENTION

Turbocompressors, or turbochargers are well known devices utilized in internal combustion engines, specifically high performance vehicles. For instance, a turbocompressor compresses the air fed to an internal combustion piston engine. By compressing the air feed, there is more air volume delivered to the engine. With increased air volume, the engine is able to increase the amount of fuel that can be burned, thereby increasing the engine power and performance of the engine. When compressing the air, the turbocompressor rotates at high speeds, which wears down the turbocompressor components. Consequently, there is a need for improved turbocompressors and processes for operating turbocompressors, which are operable at high speeds while reducing wear on turbocompressor components.

SUMMARY OF THE INVENTION

According to one embodiment of the present invention, a turbocompressor is provided. The turbocompressor comprises a turbine, a compressor, a rotatable shaft connecting the turbine and compressor at opposite ends of the shaft, and an electric motor coupled to the compressor. The turbine comprises an inlet port configured to receive a turbine air feed, and a turbine wheel connected to the shaft and configured to rotate in response to a torque ($\tau_A$) provided by the turbine air feed. The rotation of the turbine wheel is configured to rotate the rotatable shaft. The compressor comprises an inlet port configured to receive a compressor air feed, and a compressor wheel connected to the shaft and configured to rotate with the rotatable shaft, wherein the rotation of the compressor wheel is configured to compress the air feed. The compressor further comprises an outlet port configured to output the compressed air. The electric motor is configured to deliver a torque ($\tau_M$) to the compressor wheel in a direction opposite the direction of rotation of the rotatable shaft, wherein the torque ($\tau_M$) is operable to assist in stopping the rotation of the compressor wheel, the shaft, and the turbine wheel.

According to another embodiment of the present invention, a method of shutting down a turbocompressor is provided. The method comprises providing a turbocompressor comprising a turbine comprising a turbine wheel, a compressor comprising a compressor wheel, a rotatable shaft connecting the turbine wheel and the compressor wheel at opposite ends of the shaft, and an electric motor coupled to the compressor. The method also comprises rotating the turbine wheel and the rotatable shaft and compressor wheel connected thereto by delivering a torque ($\tau_A$) provided by the turbine air feed to the turbine wheel. The method further comprises shutting down the turbocompressor by delivering a torque ($\tau_M$) from the motor to the compressor wheel in a direction opposite the direction of rotation of the rotatable shaft in order to stop the rotation of the compressor wheel, the rotatable shaft and the turbine wheel.

According to yet another embodiment of the present invention, a method of shutting down a fuel cell system is provided. The method comprises providing a fuel cell system having a turbocompressor and a fuel cell stack in fluid communication with the turbocompressor. The turbocompressor comprises a turbine comprising a turbine wheel, a compressor comprising a compressor wheel, a rotatable shaft connecting the turbine wheel and the compressor wheel at opposite ends of the shaft, and an electric motor coupled to the compressor. The method also comprises rotating the turbine wheel and the rotatable shaft and compressor wheel connected thereto by delivering torque ($\tau_A$) provided by an air exhaust stream from the fuel cell stack to the turbine wheel. The method further comprises stopping the fuel cell exhaust to the turbocompressor by shutting down the fuel cell stack, and shutting down the fuel cell system by delivering a torque ($\tau_M$) from the motor to the compressor wheel in a direction opposite the direction of rotation of the rotatable shaft in order to stop the rotation of the compressor wheel, the rotatable shaft and the turbine wheel.

Additional features and advantages provided by the systems and methods of the present invention will be more fully understood in view of the following detailed description, in conjunction with the drawings

BRIEF DESCRIPTION OF THE DRAWINGS

The following detailed description of the illustrative embodiments of the present invention can be best understood when read in conjunction with the following drawings, where like structure is indicated with like reference numerals and in which.

DETAILED DESCRIPTION

Figure 1:
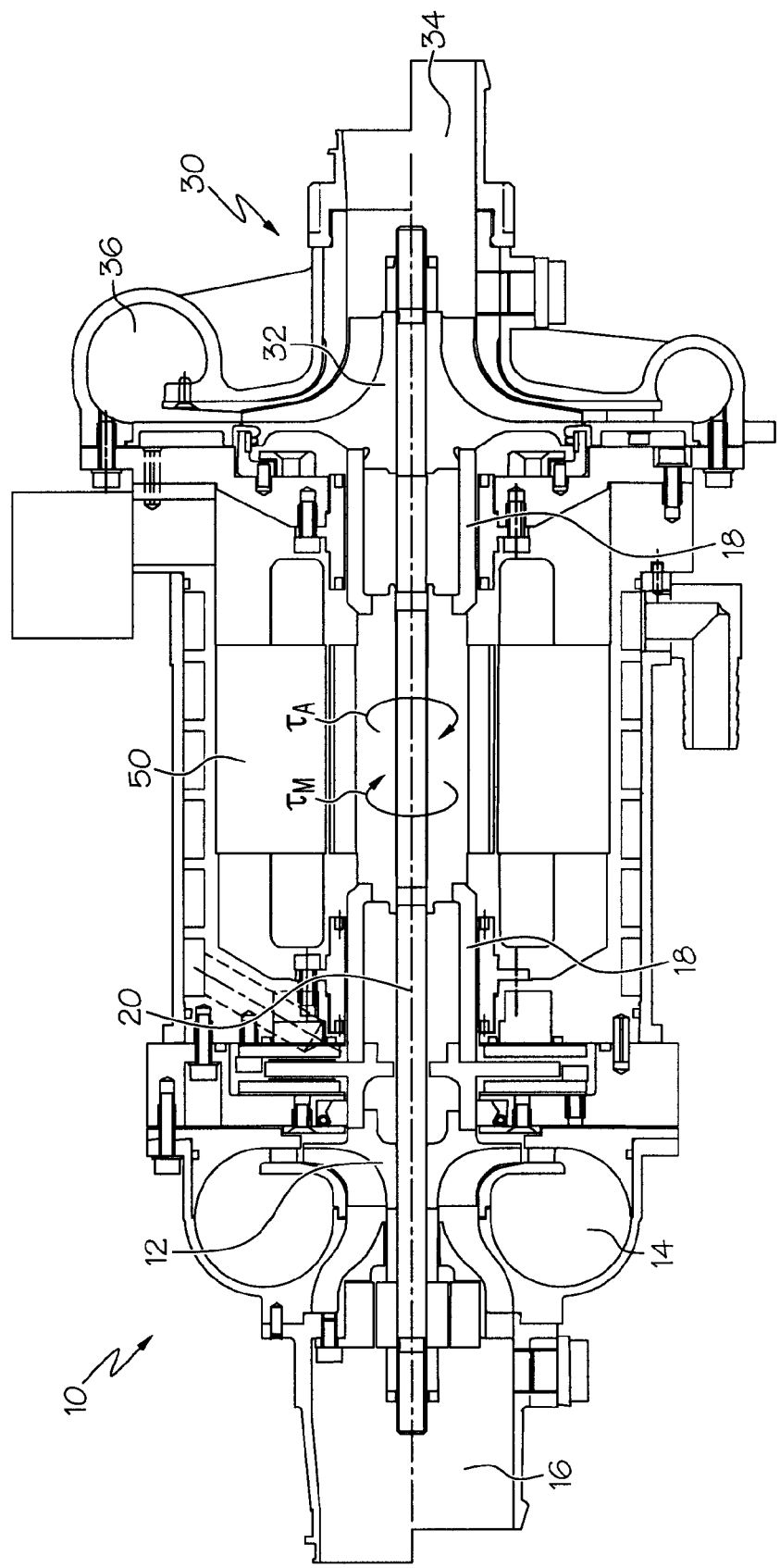
FIG. 1 is a schematic illustration of a turbocompressor according to one or more embodiments of the present invention.
Figure 2:
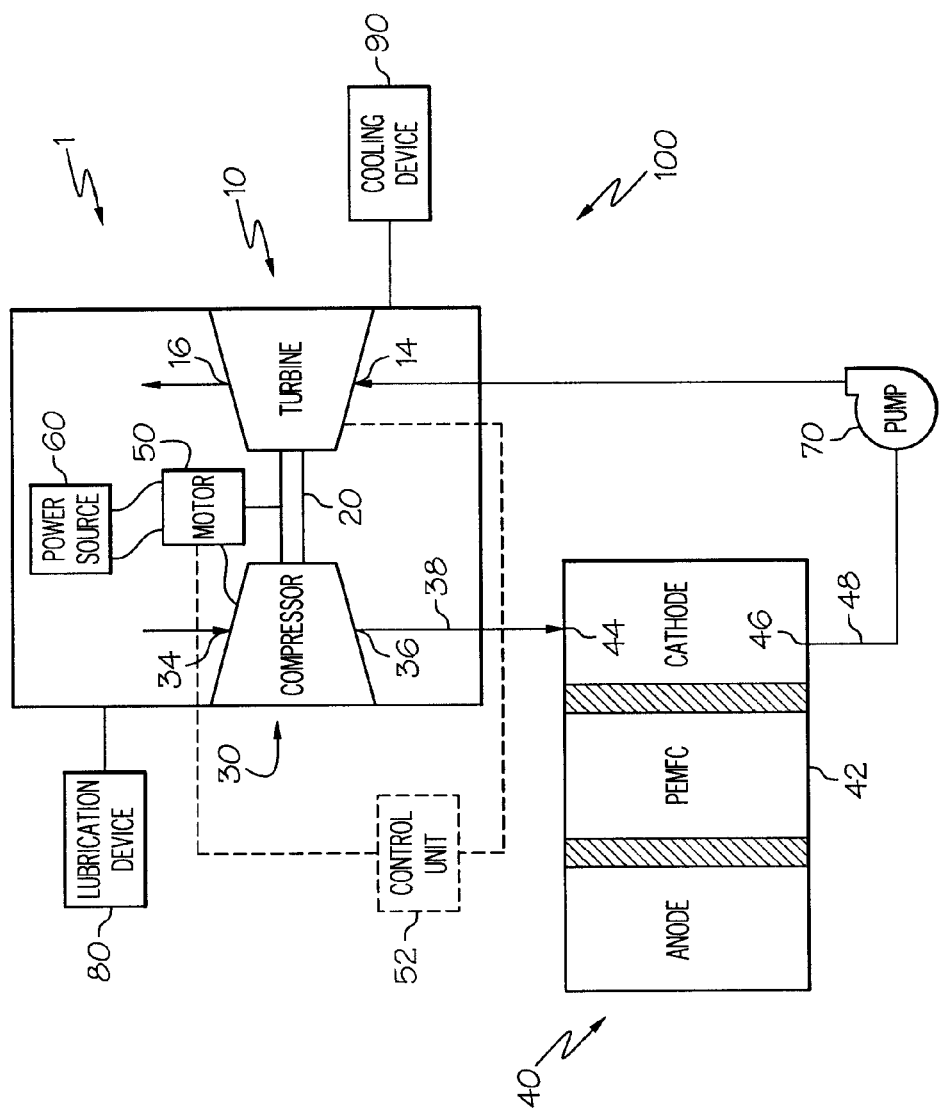
FIG. 2 is a schematic illustration of a fuel cell system according to one or more embodiments of the present invention.

Referring to the embodiments of FIGS. 1 and 2, a turbocompressor 1 is provided. The turbocompressor 1, which may be arranged inside a housing, comprises a turbine 10, a compressor 30, a rotatable shaft 20 connecting the turbine 10 and compressor 30 at opposite ends of the shaft 20, and an electric motor 50 coupled to the compressor 30. One of ordinary skill in the art would realize that many types of turbines 10, compressors 30, and motors 50 may be utilized in the turbocompressor 1. Additionally, the amount of power required may vary, for example, from about 5 to about 30 kW in vehicle applications. The turbine 10 comprises an inlet port 14 configured to receive a turbine air feed, and a turbine wheel 12 connected to the shaft 20. It is contemplated that one or multiple shafts may be used. The turbine 10 may also comprise an outlet port 16 configured to output a gaseous turbine exhaust. In one embodiment as shown in FIG. 1, the turbine wheel 12 comprises a plurality of blades arranged in a circular configuration. Other wheel 12 configurations are contemplated herein. Referring to FIG. 1, the air feed delivered through the turbine inlet 14 provides a torque $\tau_A$ to the blades of the turbine wheel 12, thus causing the turbine wheel 12 to rotate. In one exemplary embodiment, the turbine wheel 12 is operable rotate at a rate of about 30,000 rpm to about 150,000 rpm. To generate these rotational speeds, a wide range of air flow rates may be delivered to the turbocompressor 1, for example, about 50 to about 200 g/s air flow. To achieve these high rotational speeds, a pump 70 may be utilized to increase the flow rate of air to the turbine 10.

Similar to the turbine 10, the compressor 30 comprises an inlet port 34 configured to receive a compressor air feed, and a compressor wheel 32 connected to the shaft 20. Like the turbine wheel 12, the compressor wheel 32 may, in one exemplary embodiment, comprise a plurality of blades arranged in a circular configuration. Due to the interconnection of the components, the rotation of the turbine wheel 12 drives the rotation of the rotatable shaft 20 connected to the turbine wheel 12, and the rotatable shaft 20 drives the compressor. Because these devices work in tandem, the rotatable shaft 20 and compressor wheel 32 may rotate at speeds similar to the turbine wheel 12. Upon receiving the air feed through the inlet port 34, the compressor 30 is configured to compress the air feed through the rotation of the compressor wheel 32. The degree of compression varies based on the needs of the user. In one exemplary embodiment, the compressed air comprises pressures of up to about 3.5 bars and temperatures up to about 180° C. To increase air flow into the compressor 30, the compressor may produce suction which draws air into the compressor 30 via the inlet port 34. To further increase the amount of air provided to the compressor 30, the compressor may utilize a pump. Upon compressing the air feed, the compressor 30 comprises an outlet port 36 configured to output the compressed air 48.

Referring to an embodiment as shown in FIG. 1, the turbocompressor 1 may comprise bearings 18 adjacent the turbine wheel 12 and compressor wheel 32 and surrounding the shaft 20 at each end. The bearings 18 support and engage the shaft, and assist in the rotational motion of the shaft 20. The bearings 18, which define a substantially ring shaped structure that journal the shaft 20, may comprise numerous embodiments known to one of ordinary skill in the art. For example, and not by way of limitation, the bearings 18 may comprise air bearings, fluid bearings, foil bearings, thrust bearings, or combinations thereof. The air bearings have a compressible inner layer, which contacts the shaft 20 during startup and shutdown. During rotation, the compressor air feed compresses the compressible inner layer, and produces an air barrier between the shaft 20 and the inner layer of the bearings 18. Consequently, the shaft 20 does not contact the bearings 18 when it reaches its desired speed; however, the shaft 20 does contact the bearings 18 during startup and shutdown. The shaft may reach its desired speed in less than seconds, or one second or less. By contacting the shaft 20 when the shaft 20 is decelerating from or accelerating to high speeds, the bearings 18 may wear down.

To counteract the wear on the bearings 18, the present invention minimizes the amount of time in which the shaft 20 contacts the bearings 18 by minimizing the time required to shut down the compressor. To accomplish this goal, the turbocompressor 1 utilizes the electric motor 50 configured to deliver a rotational force or torque $\tau_M$ to the compressor wheel 32 in a direction opposite the direction of rotation of the rotatable shaft 20. Consequently, this torque $\tau_M$ is also directed opposite the direction of the torque provided to the turbine wheel $\tau_A$. Although the present invention couples the electric motor 50 to the compressor 30, it is contemplated that the motor 50 could also be coupled to other turbocompressor 1 components, such as the rotatable shaft 20, the turbine 10 or combinations thereof. By delivering the torque $\tau_M$, the motor 50 is able to slow down the compressor wheel 32, and thereby is also able to slow down the shaft 20, and the turbine wheel 12 connected thereto. As a result, the motor 50 may shut down the turbocompressor 1 in less than about 5 seconds, or in one embodiment, less than about 3 seconds, whereas the turbocompressor 1 may take about one to about 10 to 20 seconds to stop the turbocompressor 1 without the use of a motor 50.

The electric motor 50 may comprises a power source 60, for example, a battery. In addition to slowing down the compressor 30, it is also contemplated that the motor 50 may speed up the compressor 30 if necessary. For example, and not by way of limitation, the motor 50 may rotate the compressor 30 if insufficient air is being delivered to the turbocompressor 1. As shown in FIG. 1, the motor 50 may arranged inside the turbocompressor unit 1 or may be coupled to the turbocompressor 1 but arranged outside the turbocompressor 1 or a housing of the turbocompressor 1.

In a further embodiment as shown in FIG. 2, the turbocompressor 1 may comprise a control unit 52 configured to detect whether air is being delivered to the turbocompressor 1. Because air is delivered to the compressor 30 and the turbine 10, the control unit 52 may be configured to detect air flow in the compressor 30, the turbine 10, or, both. If the control unit 52 detects no air present, the control unit 52 triggers the motor 50 to deliver a torque ($\tau_M$) opposite the direction of rotation of the rotatable shaft 20. The control unit 52 may comprise any suitable control mechanism known to one of ordinary skill in the art. In a couple exemplary embodiments, the control unit 52 may comprise programmable logic controllers (PLC's) or valves.

To further protect the components of the turbocompressor 1, the following additional components are contemplated herein. For instance, it is contemplated to use a wear-resistant coating on the inner surface and/or outer surface of the bearing 18. The wear resistant coating may comprise any durable coating configured to withstand rotational speeds of up to 150,000 rpm and the heat produced due to these high speeds. In a few exemplary embodiments, the bearing coating may comprise metal based alloys, for example, aluminum, nickel, chromium, silicon, or niobium alloys. The coating may also comprise metal nitrides, carbides, oxides. Additionally, durable polymers, for example, PTFE, and ceramics may be utilized.

In further embodiments, the turbocompressor 1 may comprise at least one lubrication device 80, at least one cooling device 90, or both. The cooling device 90 may be any air or water cooling apparatus designed to cool the shaft 20, the bearings 18, and the turbine and compressor wheels 12, 32 of the turbocompressor 1. The lubrication device 80 may define any suitable device configured to deliver an oil or non-oil containing lubricant to the turbocompressor 1 to minimize friction.

Referring to an embodiment as shown in FIG. 2, the turbocompressor 1 may be incorporated into a fuel cell system 100. The fuel cell system 100 comprises the turbocompressor 1 and at least one fuel cell reactor 40 configured to generate electric power. The fuel cell reactor 40 comprises at least one fuel cell stack 42 and a fuel cell inlet port 44, wherein the inlet port 44 is in fluid communication with the outlet port 36 of the compressor 30. In operation, the compressed air 38 outputted from the compressor 30 is delivered to the fuel cell stack 42 via the fuel cell inlet port 44. Referring to the embodiment of FIG. 2, the compressed air 38 is delivered to the cathode side of the fuel cell stack 42. As would be familiar to one of ordinary skill in the art, the fuel cell stack 42 may comprise various fuel cell types known to one of ordinary skill in the art. For example and not by way of limitation, the fuel cell stack 42 is a proton exchange membrane fuel cell (PEMFC).

In a further embodiment, the fuel cell reactor 40 may be configured to provide power to the turbocompressor 1 and the electric motor 50. The fuel cell reactor 40 may be used to power the motor 50 instead of the power source 60, e.g. a battery. In yet another embodiment, the fuel cell stack 42 further comprises a fuel cell exhaust port 46 in fluid communication with the turbine inlet port 14. In this configuration, air exhaust 48 from the fuel cell stack 42 is delivered to the turbine 10 via the turbine inlet port 14, so that the exhaust 48 may deliver a torque $\tau_A$ in order to rotate the blades of the turbine wheel 12. To increase the flow rate of the exhaust 48 entering the turbine inlet 14, the fuel cell system 100 may, in one embodiment, include a pump 70 disposed between the fuel cell stack and turbine as shown in FIG. 2.

To shut down the fuel cell system 100, the user may first turn off the fuel cell reactor 40 by shutting down the fuel cell stack 42. This stops the flow of fuel cell exhaust 48 to the turbocompressor 1, and thereby causes the turbine wheel 12 will begin to slow down. This results in the slowing down of the rotatable shaft 20 and compressor wheel 32. To accelerate the shutdown of the turbocompressor 1, the motor 50 may deliver a torque $\tau_M$ to the compressor wheel 32 in a direction opposite the rotation of the rotatable shaft 20. The fuel cell system 100 may comprise a control unit 52, which triggers the motor 50 to provide the torque $\tau_M$ upon detecting that the air exhaust 48 is not being delivered to the turbine 10.

The turbocompressors 1 and fuel cell systems 100 incorporating turbocompressors 1 may be incorporated into various devices, e.g. cars, trucks, planes, space shuttles, etc. In one embodiment, the fuel cell system 100 may be incorporated into a vehicle. The vehicle comprises a vehicle body as would be familiar to one of ordinary skill in the art. For example, and not be way of limitation, the vehicle body may comprise a car or truck frame and all components associated therewith. In the configuration, the fuel cell system 100 is configured to power the vehicle body.

It is noted that terms like "generally", "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A proton exchange membrane fuel cell system comprising:
a turbocompressor comprising a turbine, a compressor, a rotatable shaft connecting the turbine and compressor at opposite ends of the shaft, and an electric motor coupled to the compressor wherein the turbine comprises an inlet port configured to receive a turbine air feed; and a turbine wheel connected to the shaft and configured to rotate in response to a torque ($\tau_A$) provided by the turbine air feed, the rotation of the turbine wheel being configured to rotate the rotatable shaft; the compressor comprises an inlet port configured to receive a compressor air feed; a compressor wheel connected to the shaft and configured to rotate with the rotatable shaft, the rotation of the compressor wheel being configured to compress the compressor air feed; and an outlet port configured to output the compressed air; the electric motor is configured to deliver a torque ($\tau_M$) to the compressor wheel in a direction opposite the direction of rotation of the rotatable shaft, wherein the torque ($\tau_M$) is operable to assist in stopping the rotation of the compressor wheel, the shaft, and the turbine wheel; and at least one fuel cell reactor configured to generate electric power and comprising at least one fuel cell stack and a fuel cell inlet port, wherein the inlet port is in fluid communication with the outlet port of the compressor and is configured such that the compressed air outputted from the compressor is delivered to the fuel cell stack via the fuel cell inlet port.

2. A proton exchange membrane fuel cell system according to claim 1 further comprising at least one lubrication device, at least one cooling device, or both.

3. A proton exchange membrane fuel cell system according to claim 1 further comprising at least one pump configured to deliver air to the compressor, the turbine, or both.

4. A proton exchange membrane fuel cell system according to claim 1 further comprising at least one bearing surrounding the rotatable shaft, and adjacent the turbine wheel, the compressor wheel or both.

5. A proton exchange membrane fuel cell system according to claim 1 wherein the bearings comprise air bearings, foil bearings, fluid bearings, thrust bearings or combinations thereof.

6. A proton exchange membrane fuel cell system according to claim 1 wherein the bearing comprises a coating comprising PTFE.

7. A proton exchange membrane fuel cell system according to claim 1 further comprising a control unit configured to detect whether air is being delivered to the turbocompressor and is further configured to trigger the motor to deliver the torque ($\tau_M$) when the control unit detects no air being delivered to the turbocompressor.

8. A proton exchange membrane fuel cell system according to claim 1 wherein the turbine wheel is configured to rotate at a speed of about 30,000 to about 150,000 rpm.

9. A fuel cell system according to claim 1 wherein the fuel cell reactor provides power to the electric motor.

10. A fuel cell system according to claim 1 wherein the fuel cell reactor further comprises a fuel cell exhaust port in fluid communication with the turbine inlet port and being configured such that air exhausted from the fuel cell stack is delivered to the turbine via the turbine inlet port.

* * * * *